United States Patent
Panchaksharaiah et al.

(10) Patent No.: US 12,375,771 B2
(45) Date of Patent: Jul. 29, 2025

(54) METHODS AND SYSTEMS FOR OPERATING A GROUP WATCHING SESSION

(71) Applicant: Adeia Guides Inc., San Jose, CA (US)

(72) Inventors: Vishwas Sharadanagar Panchaksharaiah, Tumkur District (IN); Vikram Makam Gupta, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/740,802

(22) Filed: Jun. 12, 2024

(65) Prior Publication Data
US 2024/0414405 A1   Dec. 12, 2024

Related U.S. Application Data

(63) Continuation of application No. 18/099,443, filed on Jan. 20, 2023, now Pat. No. 12,041,312, which is a continuation of application No. 17/529,603, filed on Nov. 18, 2021, now Pat. No. 11,589,129.

(51) Int. Cl.
| | |
|---|---|
| H04N 21/4788 | (2011.01) |
| H04N 21/234 | (2011.01) |
| H04N 21/24 | (2011.01) |
| H04N 21/258 | (2011.01) |
| H04N 21/845 | (2011.01) |

(52) U.S. Cl.
CPC ... *H04N 21/4788* (2013.01); *H04N 21/23406* (2013.01); *H04N 21/2402* (2013.01); *H04N 21/25891* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 7,996,566 B1 | 8/2011 | Sylvain et al. | |
| 9,014,535 B2 | 4/2015 | Klappert et al. | |
| 10,986,414 B1 | 4/2021 | Qureshi et al. | |
| 11,432,047 B1 | 8/2022 | Panchaksharaiah et al. | |
| 11,589,129 B1 | 2/2023 | Panchaksharaiah et al. | |
| 11,595,721 B2* | 2/2023 | Gupta | H04N 21/2387 |
| 12,041,312 B2 | 7/2024 | Panchaksharaiah et al. | |
| 12,069,331 B2* | 8/2024 | Dutta | H04N 21/4532 |
| 2005/0138658 A1* | 6/2005 | Bryan | H04H 60/27 725/35 |
| 2005/0262542 A1* | 11/2005 | DeWeese | H04N 21/454 348/E7.071 |

(Continued)

*Primary Examiner* — Alexander Q Huerta
(74) *Attorney, Agent, or Firm* — Haley Guiliano LLP

(57) ABSTRACT

Systems and methods are described for operating a group watching session. Group communication is initiated for a group watching session displaying a media content item. A bandwidth available to at least one computing device participating in the group watching session is determined. A group communication mode for a segment of the media content item is determined. A communication parameter of the group communication and/or a buffering parameter for the media content item is set in response to determining the group communication mode for the segment of the media content item and the bandwidth available to each computing device participating in the group watching session.

20 Claims, 8 Drawing Sheets

(56) References Cited

U.S. PATENT DOCUMENTS

| | | |
|---|---|---|
| 2006/0236352 A1 | 10/2006 | Scott |
| 2007/0283403 A1 | 12/2007 | Eklund et al. |
| 2010/0083324 A1 | 4/2010 | Smith et al. |
| 2011/0154417 A1* | 6/2011 | Civanlar ................. H04N 7/15 725/105 |
| 2012/0072611 A1* | 3/2012 | Kandekar .......... H04N 21/6587 709/231 |
| 2012/0242776 A1 | 9/2012 | Tucker et al. |
| 2013/0014027 A1 | 1/2013 | Lemmey |
| 2013/0076980 A1* | 3/2013 | Oren ................. H04N 21/4223 348/E5.009 |
| 2014/0149555 A1* | 5/2014 | Bank ................ H04N 21/47217 709/219 |
| 2016/0381109 A1 | 12/2016 | Barnett et al. |
| 2017/0214972 A1 | 7/2017 | Norhammar et al. |
| 2017/0257654 A1* | 9/2017 | Branch ............. H04N 21/8456 |
| 2017/0374316 A1 | 12/2017 | Patel et al. |
| 2018/0198636 A1 | 7/2018 | Paluch |
| 2018/0352303 A1 | 12/2018 | Siddique et al. |
| 2021/0409838 A1* | 12/2021 | Gattis ............. H04N 21/26258 |
| 2022/0053247 A1* | 2/2022 | Cheung ............. H04N 21/8545 |
| 2022/0159049 A1 | 5/2022 | Newton et al. |
| 2023/0291272 A1 | 9/2023 | Kaneta |

\* cited by examiner

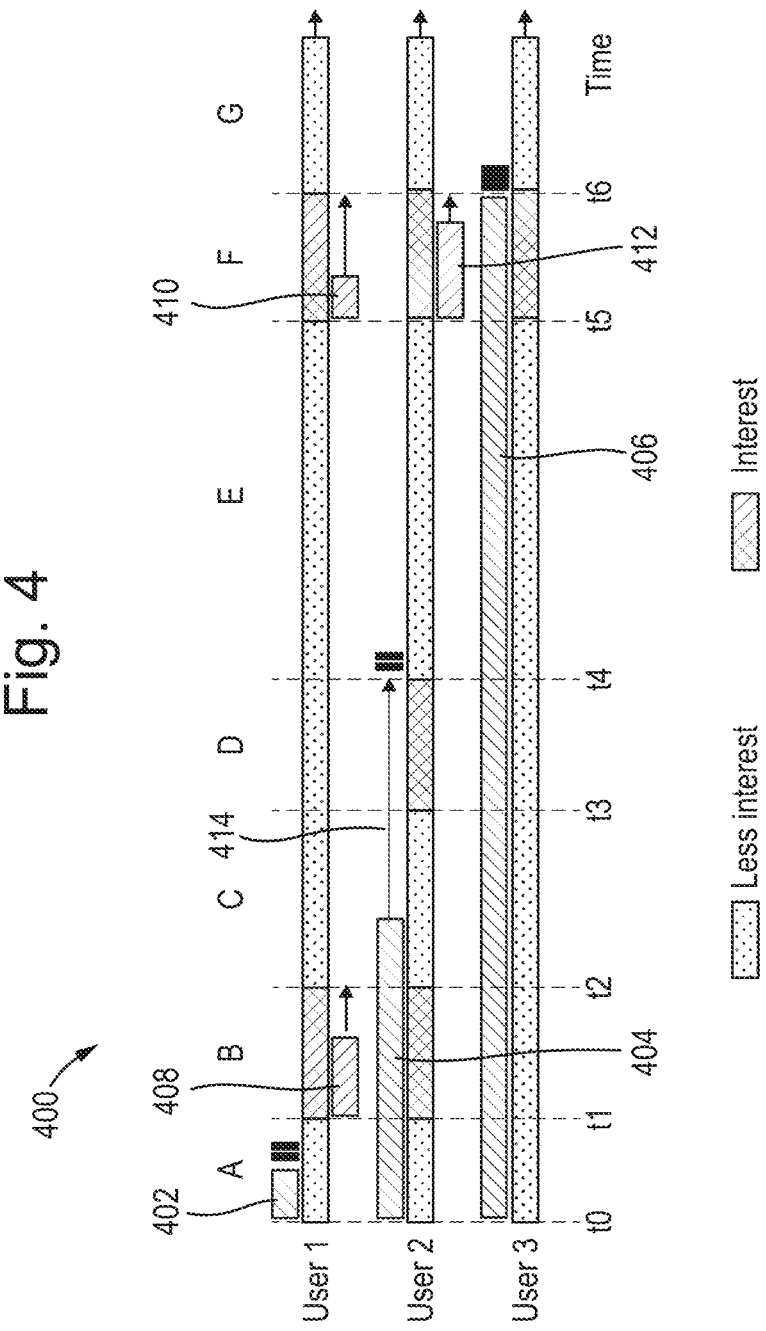

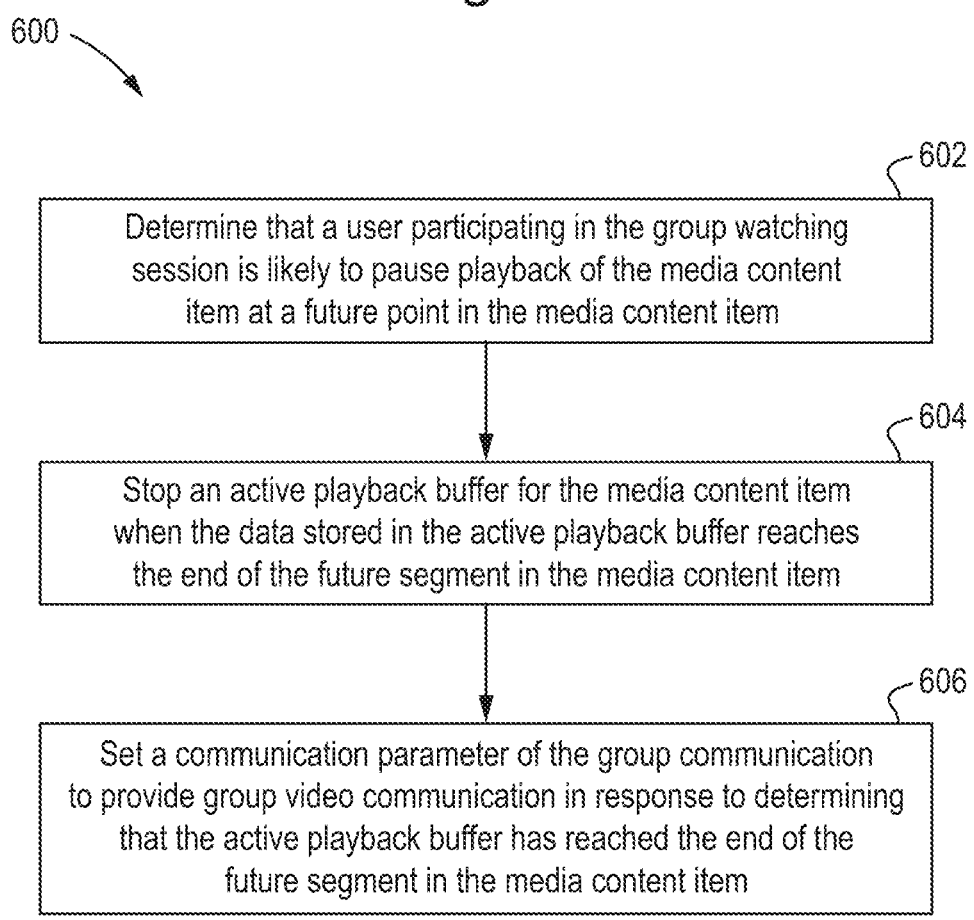

METHODS AND SYSTEMS FOR OPERATING A GROUP WATCHING SESSION

CROSS-REFERENCE TO RELATED APPLICATIONS

This application is a continuation of U.S. patent application Ser. No. 18/099,443, filed Jan. 20, 2023, which is a continuation of U.S. patent application Ser. No. 17/529,603, filed Nov. 18, 2021, now U.S. Pat. No. 11,589,129, which are hereby incorporated by reference herein in their entireties.

BACKGROUND

The present disclosure relates to methods and systems for operating a group watching session. Particularly, but not exclusively, the present disclosure relates to controlling the mode of group communication in a group watching session based on available bandwidth and common interests between the participants of the group watching session.

SUMMARY

Virtual group watching of a media content item has gained a lot of popularity in recent time. For example, where multiple users are not able to, or choose not to, physically meet, they may participate in a group watching session of a media content item, in which the viewing of the media content item is synchronised between multiple user devices. In such a group watching session, if one user pauses content, it will pause for everyone, and resume for everyone when so requested. In order to enhance the experience of the group watching session, the participants may wish to communicate with each other, e.g., whilst the media content item is paused, to discuss a particular aspect of the media content item in which they are interested. While some users may wish to use textual communication, others may wish to have a more immersive experience and communicate using video chat. However, streaming a media content item and maintaining a reliable video chat connection can consume a lot of bandwidth, and in some cases, more bandwidth than is available to one or more of the participants of the group watching session.

Systems and methods are provided herein for operating a group watching session, e.g., by controlling media content buffering and managing videoconference sessions during a group watching session. Such systems and methods may provide an improved experience for the user, e.g., by ensuring that there is sufficient bandwidth available to provide videoconference functionality between multiple participants in the group watching session while displaying a media content item in a desired manner, e.g., in a desired format with a desired quality, during a group watching session.

According to some examples of the systems and methods provided herein, group communication, e.g., audio communication and/or video communication, is initiated for a group watching session displaying a media content item. A bandwidth available to each user (or user device) participating in the group watching session is determined, e.g., to check whether there is sufficient bandwidth to support the display of the media content item and video communication. A group communication mode for one or more segments of the media content item is determined. The group communication mode may be a mode that is requested, required, used, utilized and/or performed by one or more of the users participating in the group watching session, and/or a mode in which one or more media content items are presented or consumed, e.g., in a group audio/video communication. For example, control circuitry may determine that video communication is required (e.g., desired by the users) for a first subset of segments and audio communication is required (e.g., desired by the users) for a second subset of segments. In response to determining the group communication mode required for the one or more segments of the media content item and the bandwidth available to each user participating in the group watching session, a communication parameter of the group communication and/or a buffering parameter for the media content item is set. For example, control circuitry may set, or change, a buffering parameter to initiate an advanced, e.g., future, playback buffer. Once the advanced playback buffer has been initiated, control circuitry may set, or change, a communication parameter to effect a change in the mode of communication between the users participating in the group watching session.

In some examples, the buffering parameter may be set to buffer a segment of the media content item to free up an amount of network bandwidth. The buffered segment may be displayed to the users participating in the group watching session, e.g., instead of a streamed segment. The communication parameter may be set to provide the required group communication mode using at least the amount of network bandwidth, e.g., that was freed up by switching to the buffered segment.

In some examples, determining the group communication mode required for one or more segments of the media content item comprises determining: one or more user preferences for a first user in the group watching session, e.g., by accessing a user profile, viewing history, and/or playback inputs for the first user; accessing media content item metadata relating to content of the media content item; and determining the required group communication mode based on comparing the one or more user preferences of the first user to the media content item metadata, e.g., to determine in advance which segments of the media content item the first user will be interested in.

In some examples, determining the group communication mode required for one or more segments of the media content item further comprises: determining one or more user preferences for a second user in the group watching session, e.g., by accessing a user profile, viewing history, and/or playback inputs for the second user; and determining the required group communication mode based on comparing the one or more user preferences of each of the first user and the second user to the media content item metadata, e.g., to determine in advance which segments of the media content item the first user and the second user will be interested in.

In some examples, determining the group communication mode required for one or more segments of the media content item further comprises: tagging a first subset of segments of the media content item as requiring a group audio communication mode; and tagging a second subset of segments of the media content item as requiring a group video communication mode.

In some examples, a bandwidth available to each user participating in the group watching session is determined and/or monitored. The communication parameter and/or the buffering parameter may be set or changed when the bandwidth available to at least one of the users participating in the group watching session falls below a predetermined bandwidth threshold.

In some examples, setting the communication parameter comprises changing: an audio parameter of the group communication for at least one participant of the group watching session; a video parameter of the group communication for at least one participant of the group watching session; how many of the participants in the group watching session are joined to the group communication; and/or a permitted type of communication between at least two participants of the group watching session.

In some examples, the setting of the communication parameter and/or the buffering parameter is timed relative to the display of the segment of the media content item for which the communication mode is required. For example, the buffering parameter may be set in advance of the display of a segment requiring a certain mode of group communication, so that the required mode of communication may be switched to before that segment is displayed.

In some examples, setting the buffering parameter comprises: pausing a current playback buffer in response to determining the group communication mode required for the segment of the media content item; initiating an advanced playback buffer in response to determining the group communication mode required for the segment of the media content item; maintaining an active playback buffer; and/or adjusting an amount of data in a playback buffer for at least one participant of the group watching session.

In some examples, determination may be made as to whether a user participating in the group watching session is likely to pause playback of the media content item during a future segment in the media content item, e.g., based on a conversation history of the group communication, and/or trending of a particular topic (such as a social media topic). In some examples, an active playback buffer for the media content item may be stopped when the data stored in the active playback buffer reaches the end of the future segment in the media content item. In some examples, the communication parameter may be set to provide group video communication in response to determining that the active playback buffer has reached the end of the future segment in the media content item.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 4 illustrates a diagrammatic representation of various segments of a media content item, in accordance with some examples of the disclosure;

FIG. 6 is a flowchart representing a process for providing group video communication in a group watching session, in accordance with some examples of the disclosure.

DETAILED DESCRIPTION

Figure 1A:
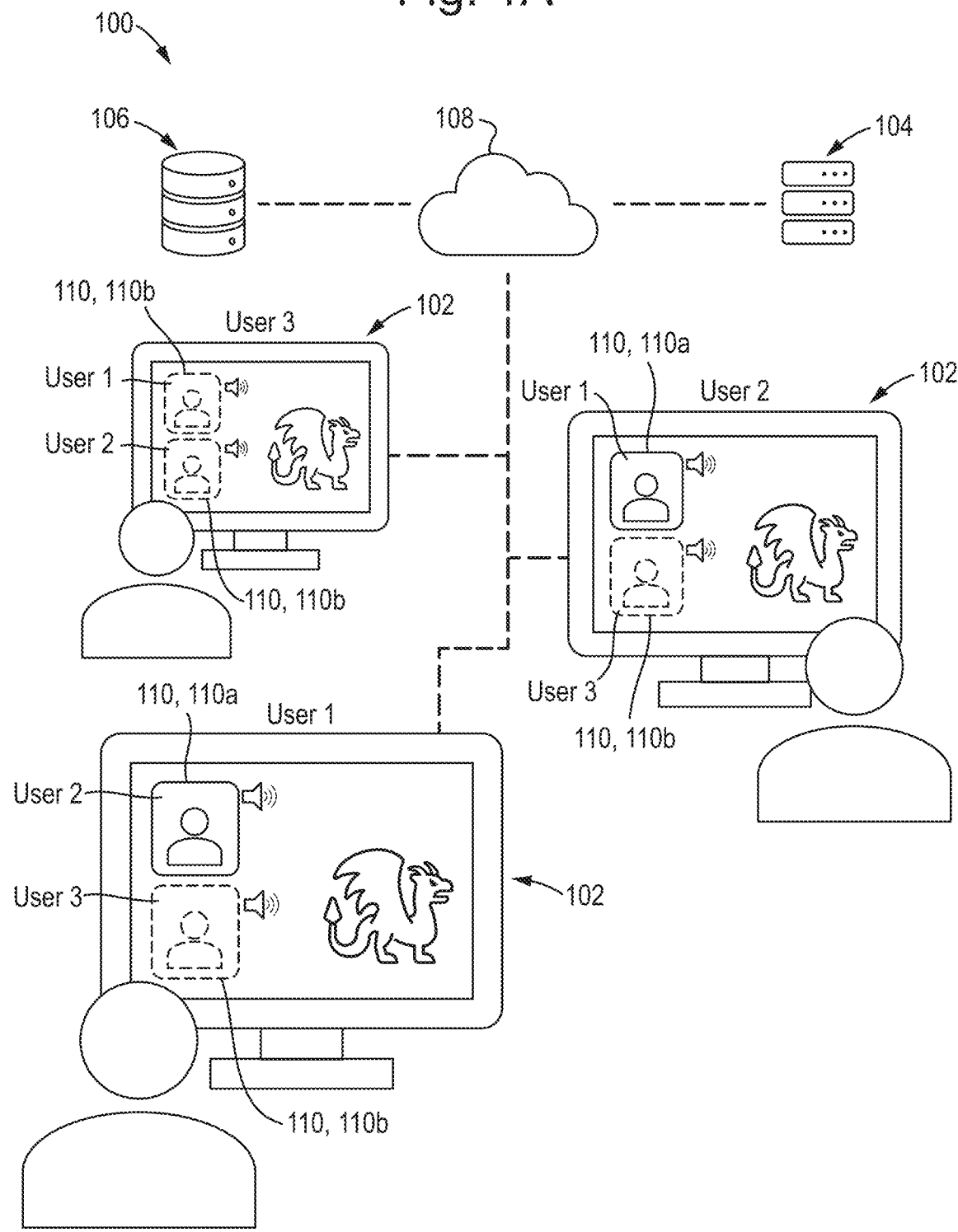
FIG. 1A illustrates an overview of a system for operating a group watching session, in accordance with some examples of the disclosure.
Figure 1B:
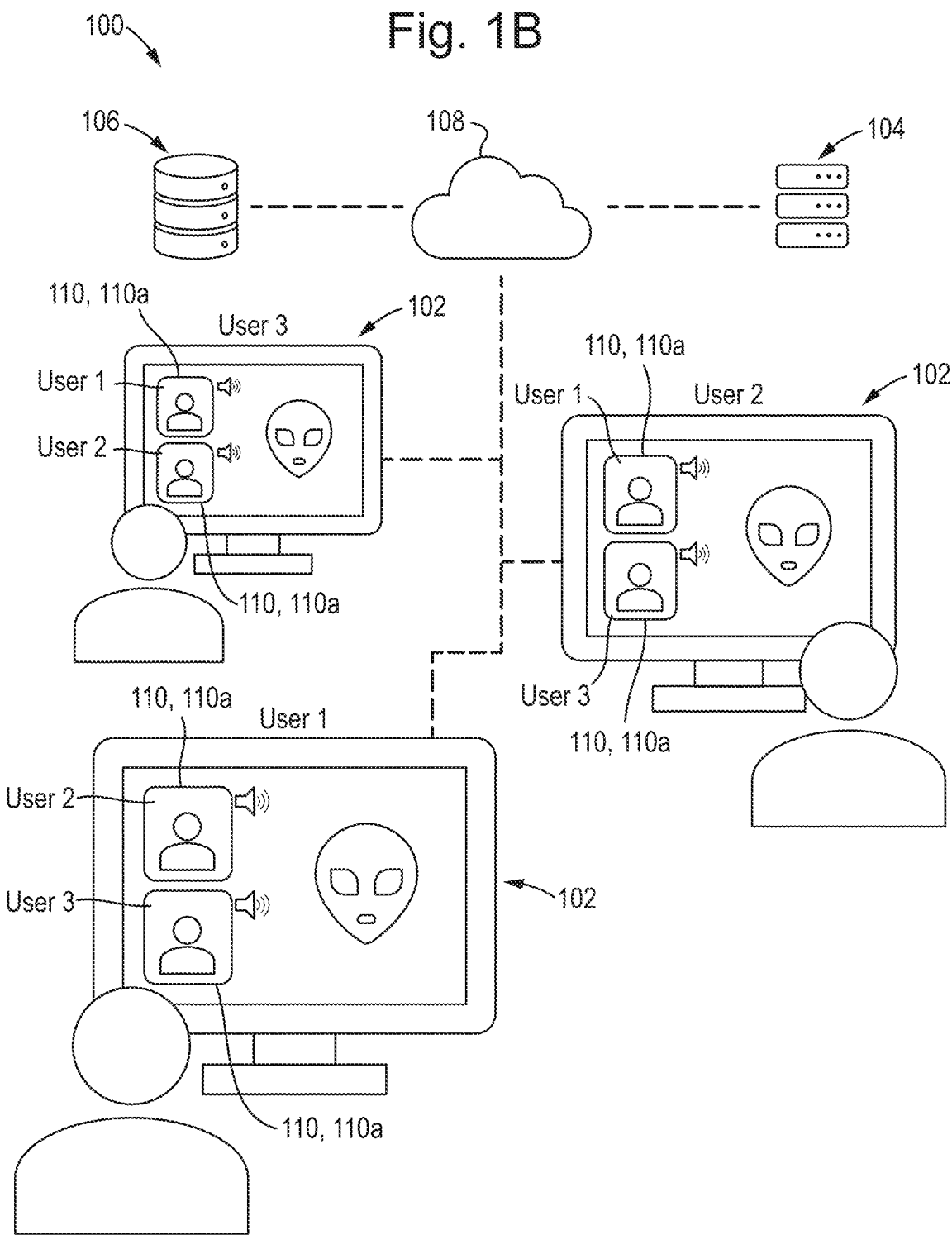
FIG. 1B illustrates another overview of the system for operating a group watching session, in accordance with some examples of the disclosure.

FIG. 1A illustrates an overview of a system 100 for operating a group watching session, in which the viewing of a media content item is synchronised for multiple users. In particular, the example shown in FIG. 1A illustrates three users viewing a first segment of a media content item and participating in a first mode of group communication. FIG. 1B illustrates the system 100 of FIG. 1A, but with the three users viewing a second segment of the media content item and participating in a second mode of group communication. To put the examples shown in FIGS. 1A and 1B into context, there might be certain segments in the media content item for which the users, e.g., all the users, share a common interest and are thus likely to want to participate in a videoconference for the purpose of discussing that segment of interest. As such, it is important to have a videoconference connection established in advance, or at least just in time for, the viewing of the segment of interest. Moreover, it is desirable that the establishment of a videoconference connection is carried out automatically by system 100 without affecting the viewing of the media content item in the group watching session. For example, when a videoconference connection is established and maintained during a segment of interest, the streaming quality of the segment of interest may have to be reduced owing to a bandwidth constraint. The present disclosure, as discussed in detail below, provides improved methods for maintaining a desired quality of a streamed media content item while providing videoconference functionality, e.g., in a group watching session, such as a virtual watch party or a virtual meeting.

In the example shown in FIGS. 1A and 1B, system 100 includes multiple user devices 102, such as a tablet computer, a smartphone, a smart television, or the like, configured to display media content to one or more respective users. System 100 may also include network 108 such as the Internet, configured to communicatively couple user devices 102 to one or more servers 104 and/or one or more content databases 106 from which media content, such as TV shows, movies and/or advertisement content, may be obtained for display on the user devices 102. User devices 102 and the one or more servers 104 may be communicatively coupled to one another by way of network 108, and the one or more servers 104 may be communicatively coupled to content database 106 by way of one or more communication paths, such as a proprietary communication path and/or network 108. In some examples, server 104 may be a server of a service provider who provides media content for display on user devices 102.

In some examples, system 100 may comprise an application that provides guidance through an interface, e.g., a graphical user interface, that allows users to efficiently navigate media content selections, navigate an interactive media content item, and easily identify media content that they may desire, such as content provided on a database on one or more live streams. Such guidance is referred to herein as an interactive content guidance application or, sometimes, a content guidance application, a media guidance application, or a guidance application. In some examples, the application may be configured to provide a recommendation for a content item, e.g., based on a user profile and/or an endorsement profile of the content item. For example, the application may provide a user with a recommendation based for a content item based on one or more endorsements present, e.g., visibly and/or audibly present, in the content item. In some examples, the application provides users with access to a group watching session and/or group communication functionality. For example, the application may provide a user with an option to join a group watching session and participate in group communication with one or more other users participating in the group watching session.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset", "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "computing device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, subtitle data, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
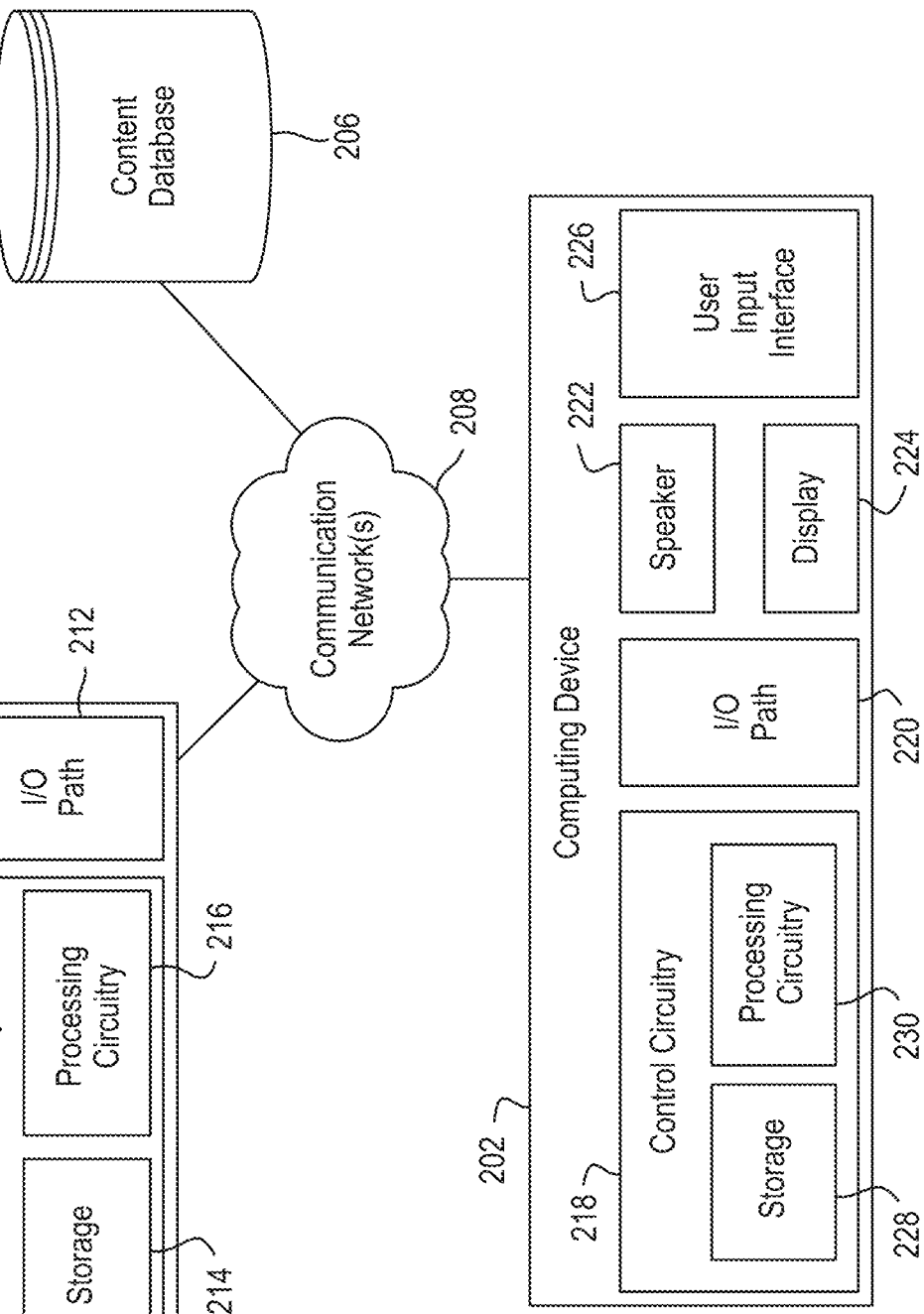
FIG. 2 is a block diagram showing components of an exemplary system for operating a group watching session, in accordance with some examples of the disclosure.

FIG. 2 is an illustrative block diagram showing exemplary system 200 configured to display media content. Although FIG. 2 shows system 200 as including a number and configuration of individual components, in some examples, any number of the components of system 200 may be combined and/or integrated as one device, e.g., as user device 102. System 200 includes computing device 202, server 204 (e.g., server 106 and/or server 108), and content database 206, each of which is communicatively coupled to communication network 208, which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user selectable option for enabling and disabling the display of modified subtitles. Control circuitry 218 includes storage 228 and processing circuitry 220. Control circuitry 210 and/or 218 may be based on any suitable processing circuitry such as processing circuitry 216 and/or 220. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions, e.g., to view an interactive media content item and/or select one or more programming options of the interactive media content item, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

Figure 3:
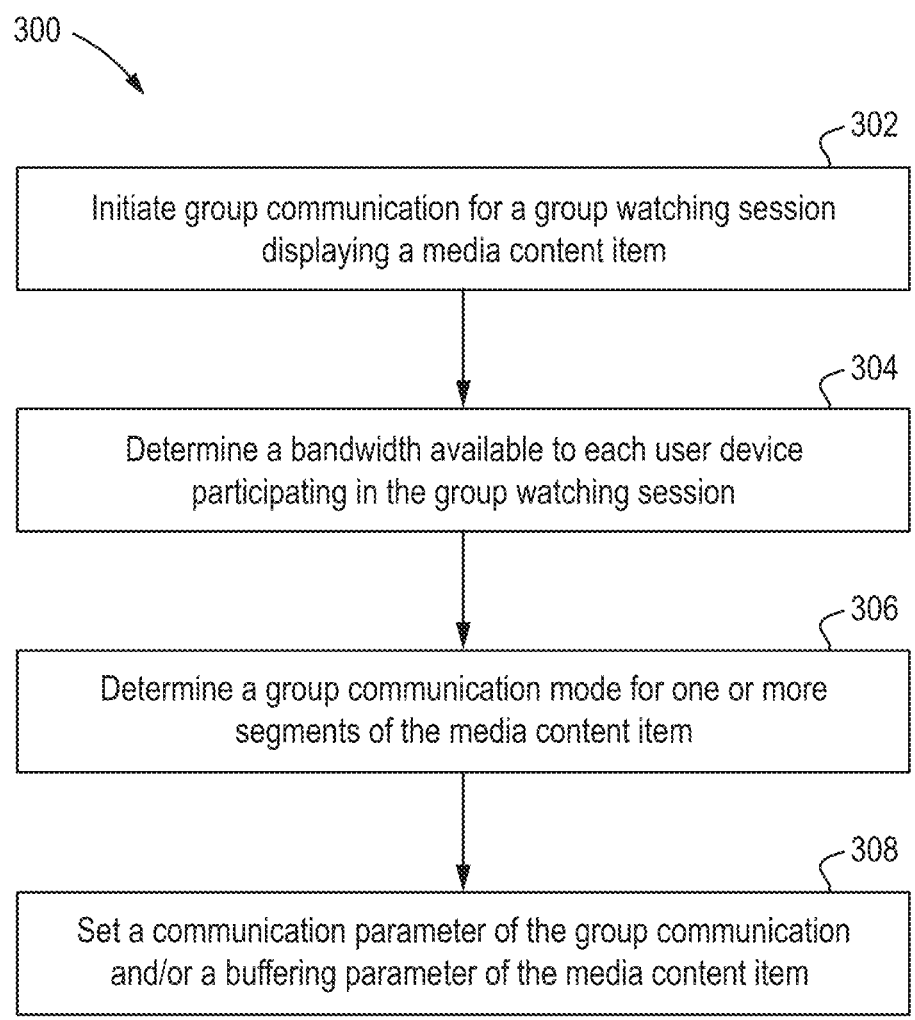
FIG. 3 is a flowchart representing a process for operating a group watching session, in accordance with some examples of the disclosure.

FIG. 3 is a flowchart representing an illustrative process 300 for operating a group watching session, in accordance with some examples of the disclosure. While the example shown in FIG. 3 refers to the use of system 100, as shown in FIGS. 1A and 1B, it will be appreciated that the illustrative process shown in FIG. 3, and any of the other following illustrative processes, may be implemented on system 100, either alone or in combination with any other appropriately configured system architecture, such as system 200 shown in FIG. 2.

At step 302, control circuitry initiates a group communication session (hereinafter referred to as group communication) for a group watching session displaying a media content item. For example, control circuitry may cause each user participating in the group watching session to join, e.g., automatically join, group communication having videoconference and teleconference functionality. For the purposes of present disclosure, the term video communication is used to describe videoconference functionality, e.g., a communication function having video and audio elements, whereas the term audio communication is used to describe teleconference functionality, e.g., a communication function having only an audio element. In some examples, the group communication is initiated in response to a user initiating a group watching session. For example, a first user may set up a group watching session and invite one or more other users to join. When another user joins the group watching session, they may be also joined to the group communication. In the example shown in FIGS. 1A and 1B, the group watching session has three participants, User 1, User 2 and User 3, each watching a media content item on respective user devices 102. The group communication is represented by user icons 110 towards the left of a screen of each user device 102. However, in one or more examples (not shown) the group communication may be provided on one or more other user devices separate from user device 102. For example, each user may have the option/ability to display the media content item of the group watching session on a first device, e.g., user device 102, and the group communication on another device, such as a smartphone or tablet.

At step 304, control circuitry determines a bandwidth available to each user or computing device participating in (e.g., connected to network 108 used for) the group watching session. For example, control circuitry may access data relating to bandwidth statistics for each user, to determine the current bandwidth available to a user and/or historic bandwidth previously available. For example, control circuitry may analyse a user's bandwidth data to determine one or more patterns or trends in the bandwidth available to the user. Additionally or alternatively, control circuitry may determine one or more other parameters relating to the display of the media content item on the user's device 102, such as the type of device (e.g., phone, tablet, laptop), device resolution capability (e.g., 4K, 1080 p), network type (e.g., wi-fi, cellular), a connection speed to a content provider server (e.g., server 104), one or more settings in a user profile (e.g., indicating a preferred display quality), and/or data relating to historic user viewing. As such, control circuitry is able to understand the operational parameters that govern the ability of user device 102 to display the media content item in a desired state. For example, control circuitry may determine that User 1 has an average bandwidth of 10 Mbps and prefers to watch a media content item on a tablet in the highest definition possible, User 2 has an average bandwidth of 60 Mbps and is indifferent about the quality of the media content item so long as it does not stall, and User 3 has an average bandwidth of 220 Mbps and prefers to watch a media content item only an 8K screen.

At step 304, control circuitry determines a group communication mode required for a segment of the media content item. For example, control circuitry may determine that a first group communication mode comprising video communication between all users participating in the group watching session is required for one segment of the media content item, and a second group communication mode comprising video communication between some of the users participating in the group watching session is required for another segment of the media content item. In order to make that determination, control circuitry may be configured to cross reference one or more preferences/interests of the user(s) with the content of the media content item. Where the interests/preferences of one or more users participating in the group watching session match the content of a segment of the media content item, control circuitry may tag that segment as a segment of interest. The required communication mode for any given segment of the media content item can then be chosen based on a correlation between interests/preferences of each of the users and the content of that segment of the media content item, e.g., as described or defined by media content item metadata. In the example shown in FIG. 1A, a first communication mode is required providing video communication between User 1 and User 2, and audio communication between User 3 and Users 1 and 2. In the example shown in FIG. 1B, a second communication mode is required providing video communication between User 1, User 2 and User 3. The implementation of step 304 is described below in further detail in relation to step 510 of process 500.

At step 308, control circuitry sets a communication parameter of the group communication and/or a buffering parameter for the media content item. For example, in response to determining that a certain group communication mode is required for a segment of the media content item, e.g., all users connected via video communication during the segment, control circuitry may set, or change, a communication parameter of the group communication to effect a change in how the users participating in the group watching session are able to communicate. For example, control circuitry may change a communication parameter from audio to video for one or more users participating in the group watching session. In some examples, a communication parameter defines the type of communication possible between all of the users participating in the group watching session or a subset of users participating in the group watching session. For example, multiple communication parameters may be set to enable the first communication mode requiring video communication between User 1 and User 2, audio communication between User 3 and Users 1 and 2 (shown in FIG. 1A), and a single communication parameter (e.g., a general/master communication parameter) may be set to enable the second communication mode requiring video communication between all of the users (shown in FIG. 1B).

In a similar manner, in response to determining that a certain group communication mode is required for a segment of the media content item, e.g., all users connected via video communication during the segment, control circuitry may set, or change, a buffering parameter of the media content item to effect a change in how the segment of the media content item is generated for display on the user device 102. For example, control circuitry may set a buffering parameter to cause the segment to be generated from buffered data, e.g., that is stored in a buffer on user device 102, instead of from, e.g., directly from, data streamed from a content provider. In some examples, control circuitry may cause the segment to be buffered ahead of time, such that as users progress through the media content item to the segment, streaming of data from the content provider may be paused, or terminated, and video communication between the user can be initiated using the bandwidth that had previously been used to stream the media content item. In this manner, the media content item can be continued to be displayed, e.g., in a desired quality, and the video communication can be enabled between users, which may not have been possible where bandwidth to one or more users is insufficient to stream the media content item and allow for video communication at the same time.

The actions or descriptions of FIG. 3 may be used with any other example of this disclosure, e.g., the example described below in relation to FIGS. 4, 5A, 5B and 6. In addition, the actions and descriptions described in relation to FIG. 3 may be done in any suitable alternative orders or in parallel to further the purposes of this disclosure.

Figure 5A:
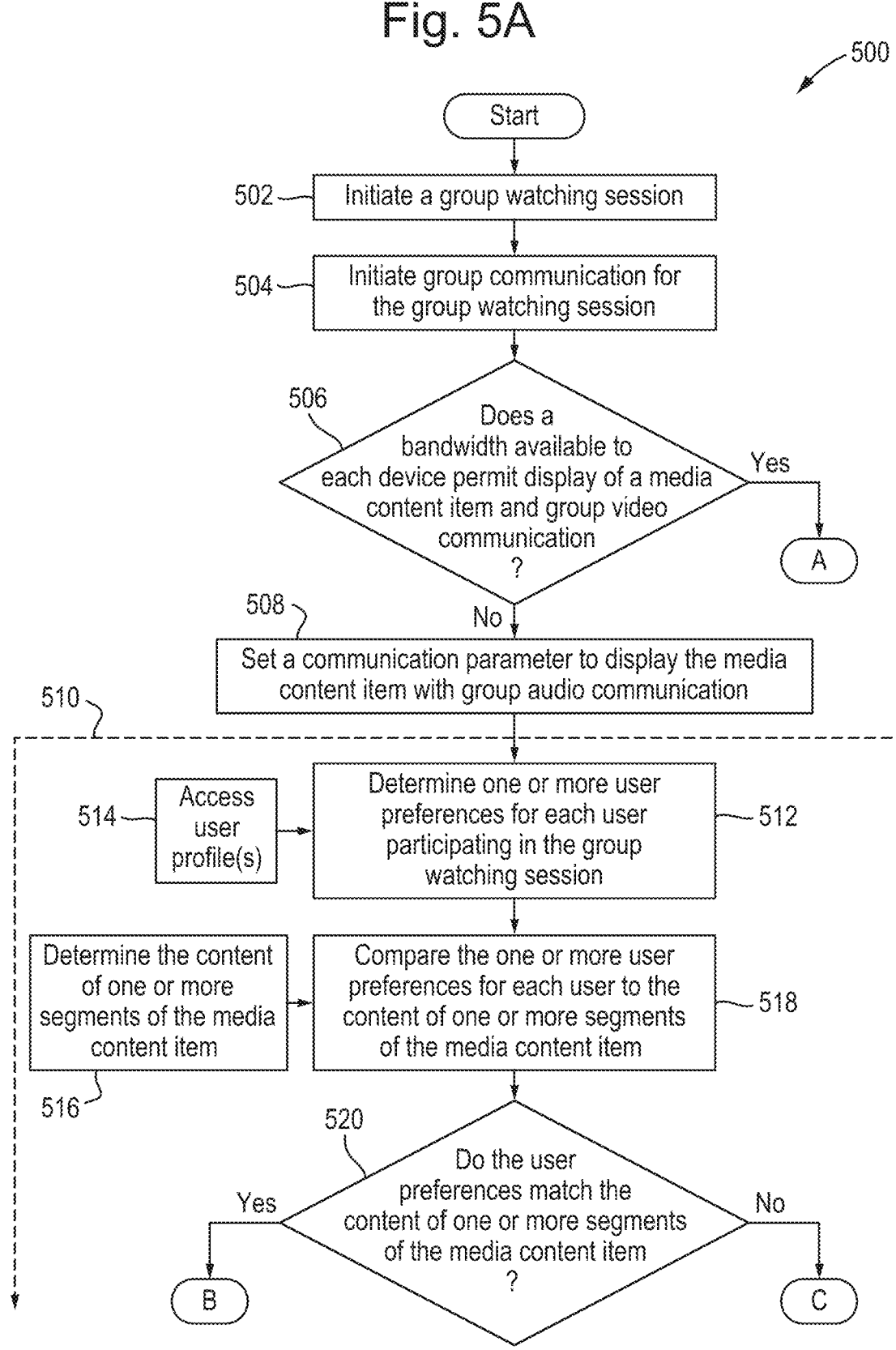
FIG. 5A is a flowchart representing another process for operating a group watching session, in accordance with some examples of the disclosure.
Figure 5B:
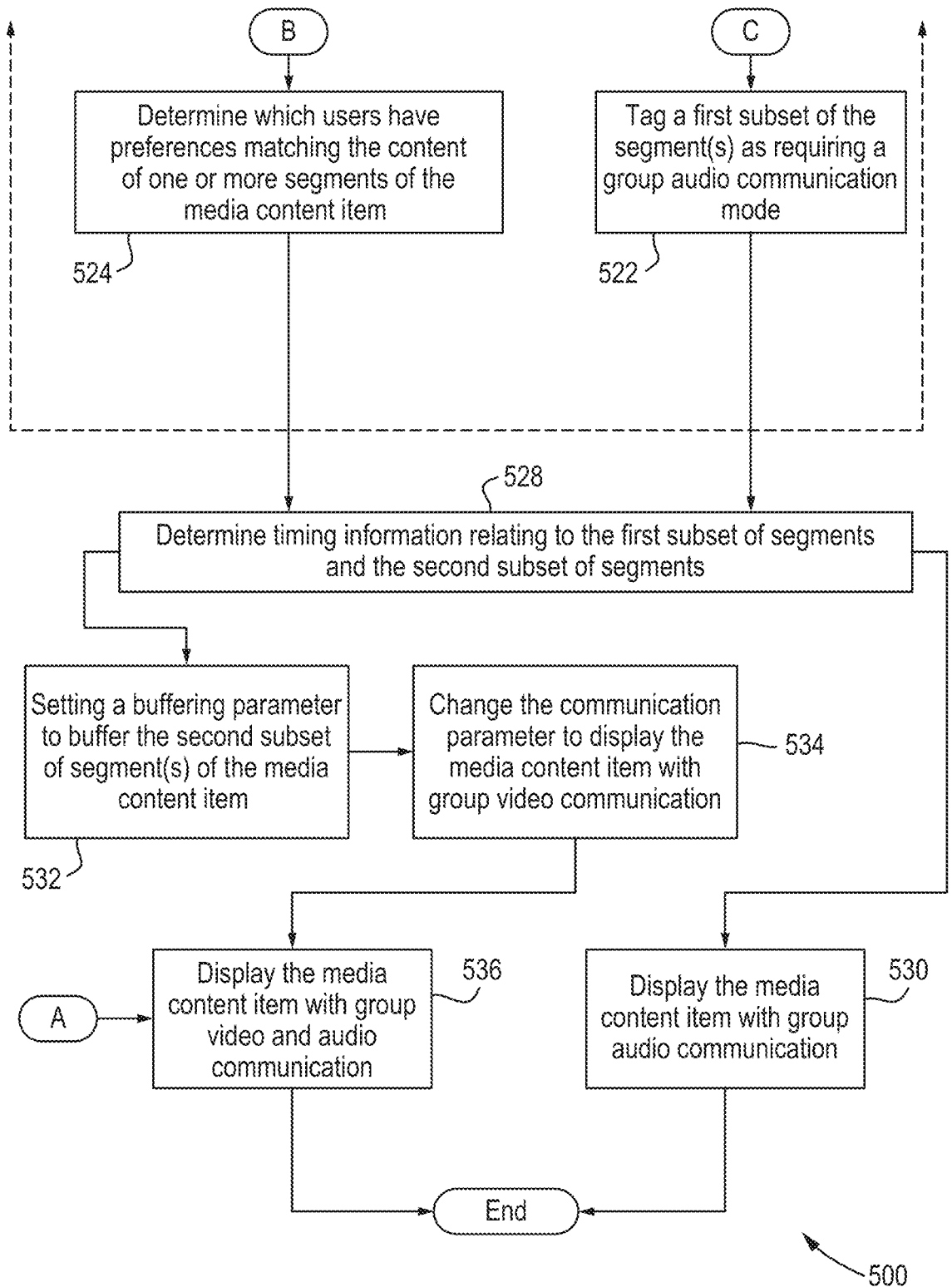
FIG. 5B is a continuation of the flowchart shown in FIG. 5A.

FIG. 4 illustrates a diagrammatic representation of various segments of a media content item and FIGS. 5A and 5B is a flowchart representing another process for operating a group watching session, in accordance with some examples of the disclosure. While the example shown in FIGS. 5A and 5B refers to the use of system 100, as shown in FIGS. 1A and 1B, it will be appreciated that the illustrative process shown in FIGS. 5A and 5B, and any of the other following illustrative processes, may be implemented on system 100, either alone or in combination with any other appropriately configured system architecture, such as system 200.

At step 502, control circuitry initiates a group watching session, e.g., based on a user instruction received by a guidance application. For example, a group of users may have arranged to meet virtually for a group watching session of a media content item. In some examples, the group watching session may be started by one of the users in the group.

At step 504, control circuitry initiates group communication for the group watching session, e.g., in a similar manner to that described for step 302 of process 300. In some examples, the group communication may be started in response to multiple users in the group of users joining the group watching session.

At step 506, control circuitry determines if a bandwidth available to each user permits the display of a media content item and group video communication during, e.g., throughout, the group watching session. The bandwidth available to a user may be determined in a similar manner to that described for step 304 of process 300. For example, control circuitry may compare an average amount of bandwidth available to a user to the amount of bandwidth required to stream the media content item from a content provider, e.g., in a quality indicated by the user, and provide group video communication, e.g., in a minimum desired quality, between the user and one or more other users participating in the group watching session. When the bandwidth is sufficient to display the media content item and provide group video communication, e.g., for the duration of the media content item, process 500 moves to step 536, described below in more detail. When the bandwidth is insufficient to display the media content item and provide group video communication, e.g., for the duration of the media content item or at any point during the media content item, process 500 moves to step 508. In some examples, the determination that the bandwidth is insufficient to display the media content item and provide group video communication may be based on when one user or multiple users participating in the group watching session have insufficient bandwidth, or when all of the users participating in the group watching session have insufficient bandwidth. For the sake of example only, the below process assumes that some of the users have insufficient bandwidth to display the media content item and provide group video communication for the duration of the media content item, e.g., as a result of high bandwidth requirements for streaming the media content item and providing video communication in high quality.

At step 508, control circuitry sets a communication parameter to cause the group communication to be provided in audio only, e.g., from the beginning of the media content item, which maximises the amount of bandwidth available for buffering data relating to the display of the media content item, while displaying the media content item in high quality and maintaining group communication.

At step 510, control circuitry determines a group communication mode required for one or more segments of the media content item, e.g., in a similar manner to that described for step 306 of process 300. Additionally or alternatively, to that described for step 306, step 510 comprises steps 512 to 524.

At step 512, control circuitry determines one or more user preferences for each user participating in the group watching session. For example, control circuitry may access, e.g., at step 514, a user profile for each user participating in the group watching session to determine one or more topics of interest of the user. In some examples, a user preference may be determined from one or more selected topics in the user's profile. For example, Users 1 and 2 may indicate, e.g., by manual input, that they are interested in the genre of fantasy, whereas User 3 may indicate that they dislike, or have no preference either way for fantasy content. Additionally or alternatively, a preference of a user may be determined by analyzing historic viewing data of the user, one or more past communications of the user, and/or any other appropriate data that may indicate what the user is interested in. In this manner, system 100 may derive an understanding of which segments of a media content item a user may be interested in discussing with one or more other participants in the group watching session, e.g., by virtue of a segment containing a favorite actor, being of a particular genre, etc.

At step 516, control circuitry determines the content of one or more segments of the media content item that the users are watching in the group watching session. For example, control circuitry may access metadata relating to the media content item and determine the audio/visual content of the segment, e.g., as containing a certain actor, and/or being of a particular genre, etc. Additionally or alternatively, the metadata may indicate a start time and an end time of a segment. For example, the metadata may provide one or more timestamps that indicate the start time of a segment of the media content item containing fantasy content, and/or a particular actor, etc. In this manner, system 100 is able to derive an understanding of the audio/visual content of a scene or frame of the media content item.

At step 518, control circuitry compares the one or more user preferences for each user to the content of one or more segments of the media content item.

At step 520, control circuitry determines if one or more of each user's preferences match the content of one or more segments of the media content item, based on the comparison at step 518. For example, control circuitry may determine if a user's interests at least partially map onto the content of one or more segments of the media content item. FIG. 4 illustrates which segments of the media content item each user might have interest in, based on a comparison between the user's preferences and the media content item metadata. For example, FIG. 4 shows segments A-G of a media content item, and whether each user is interested in those segments. In particular, FIG. 4 shows that User 1 has no or less interest in segments A, C, D, E and G, User 2 has less interest in segments A, C, E and G, and User 3 has less interest in segments A, B, C, D, E and G. When control circuitry determines that none of the users are interested in a segment, process 500 moves to step 522. FIG. 4 also shows that User 1 has interest in segments B and F, User 2 has interest in segments B, D and F, and User 3 has interest in segment F. As such, FIG. 4 shows commonality between the users' interests and provides to system 100 an indication of which segments of the media content item the users may have an interest in discussing over video communication. Since commonality between the interests of User 1 and User 2 has been shown for segment B, and commonality between the interests of User 1, User 2 and User 3 has been shown for segment F, process 500 moves to step 524.

At step 522, control circuitry tags a first subset of the segments as requiring a first group communication mode, e.g., a group audio communication mode. For example, based on a lack of interest of any of the participants of the group watching session in segments A, C, E and G, control circuitry tags these segments to indicate that video communication is not required, or at least not likely to be required, during the viewing of these segments. As such, system 100 can prioritize using the available bandwidth to maintain display of these segments in the desired quality.

At step 524, control circuitry tags a second subset of the segments as requiring at least a second group communication mode, e.g., a group video communication mode. For example, based on the commonality of interest for segment B and F, control circuitry tags these segments as requiring group video communication. As such, system 100 can manage how the bandwidth available to each user is used to ensure that display of the media content item remains uninterrupted and adequate video communication is provided between users. In the example shown in FIG. 4, User 2 is the only user likely to be interested in segment D. As such, there is no commonality between the users' interests relative to segment D, and segment D is included in the first subset. However, in one or more other examples, segment D may be included in the second subset, based solely on the likelihood of User 2 wishing to discuss the content of segment D with the other users.

At step 510, the configuration of the required communication modes may depend on the type of content being displayed to the users and the interest of respective users in that content. For example, FIG. 1A shows segment B of the media content item comprising a scene having a dragon. As mentioned above, FIG. 4 shows that only User 1 and User 2 are interested in segment B. As such, the required communication mode for segment B comprises video communication between User 1 and User 2. However, since the preferences of User 3 show that User 3 has little or no interest in dragons, and/or the fantasy genre more broadly, there is no requirement to establish video communication with User 3. FIG. 1B shows segment F of the media content item comprising a scene having an alien. As mentioned above, FIG. 4 shows that all the Users are interested in segment F. As such, the required communication mode for segment F comprises video communication between User 1 and User 2, User 1 and User 3, and User 2 and User 3, since the preferences for all users indicate that they are interested in aliens, and/or the sci-fi genre more broadly.

At step 528, control circuitry determines timing information relating to the first subset of segments and the second subset of segments. For example, control circuitry may access metadata relating to the media content item to determine the start time and/or the end time of each of the identified segments in the subsets. In response to determining the start time and/or the end time of each segment in the first subset, process 500 moves to step 530. In response to determining the start time and/or the end time of each segment in the second subset, process 500 moves to step 532.

At step 530, control circuitry causes the display of each segment in the second subset on the user device 102 with group audio communication, e.g., as the users progress through the media content item. For example, control circuitry may cause the display of segments A, C, E and G without video communication, in turn. It is beneficial for system 100 to have prior understanding of which segments of the media content item require group audio communication, e.g., without video, as it allows system 100 to prioritize the use of available bandwidth for the display of the media content item in the desired quality on each user device, and/or for buffering one or more portions of the media content item, e.g., as required by the below steps.

At step 532, control circuitry sets a buffering parameter to buffer the second subset of segments of the media content item. In the context of the present disclosure, a buffering parameter is understood to mean any parameter that defines the operation of at least one buffer for buffering one or more segments of the media content item, e.g., on each user device 102. For example, FIG. 4 shows various buffers that are managed by system 100, such as a current playback buffer 402 for User 1, a current playback buffer 404 for User 2 and a current playback buffer 406 for User 3. In response to determining the group communication modes required for each segment in the second subset and the timing information relating to at least the start time of each segment, control circuitry sets, or changes, one or more buffering parameters. For example, for User 1, control circuitry pauses current playback buffer 402, and initiates a first advanced playback buffer 408 for segment B (e.g., between time t1 and t2), and a second advanced playback buffer 410 for segment F (e.g., between time t5 and t6). For the avoidance of doubt, each advance playback buffer for a particular segment may begin before viewing progress reaches that segment (and in the example shown in FIG. 4, the first advanced playback buffer 408 and the second advanced playback buffer 410 each represent a content portion being buffered, and not necessarily the act and/or the timing of the advance buffer). It is beneficial to initiate advanced playback buffers 408 and 410 before viewing progress reaches the start of segments B and F, so that control circuitry can switch from using streamed data to using the buffered data to generate the display of the segment. As a result, bandwidth is made available for use in providing group video communication during segments B and F. For User 2, the amount of available bandwidth is sufficient such that current playback buffer 404 has already buffered segment B. As such, control circuitry pauses current playback buffer 404 (e.g., at a point between time t2 and t3), and initiates a third advanced playback buffer 412 for segment F only (e.g., between time t5 and t6). For User 3, who has a large amount of available bandwidth, there is no need to initiate any advanced playback buffers, since the current playback buffer 406 has already buffered segment F.

At step 534, control circuitry sets the communication parameter to display segment B and F of the media content item with group video communication, e.g., ahead of, or just in time for, the display of these segments to the users. In this manner, the mode of communication is switched from an audio mode to a video mode, which is enabled by system 100 using the buffered data to display the media content item, instead of using available bandwidth.

Turning back to step 530, the segments in the first subset, e.g., segments A, C, D, E and G, are displayed in turn on the respective user devices 102 accompanied by group audio communication.

At step 536, the segments in the second subset, e.g., segments B and F, are displayed in turn on the respective user devices 102 accompanied by group video communication. In the example shown in FIG. 1A, the users are currently watching segment B of the media content item showing a scene with a dragon, and user icons 110 indicate the type of group communication established between the users. For example, user icons 110a indicate that video communication is established between User 1 and User 2 (shown by solid outlines on the icons), and user icons 110b indicate that audio communication is established between User 1 and User 3, and User 2 and User 3 (shown by dashed outlines on the icons). As discussed above, this mode of communication requires only Users 1 and 2 to have video communication, since there is commonality between the interests of User 1 and 2, and no commonality of interest between User 3 and Users 1 and 2. In the example shown in FIG. 1B, the users are currently watching segment F of the media content item showing a scene with an alien, and user icons 110 indicate the type of group communication established between the users. For example, user icons 110a indicate that video communication is established between all the users (shown by solid outlines on the icons). As discussed above, this mode of communication requires video communication between all of the users owing to their common interest in the content of segment F.

The actions or descriptions of FIGS. 5A and 5B may be used with any other example of this disclosure. In addition, the actions and descriptions described in relation to FIGS. 5A and 5B may be done in any suitable alternative orders or in parallel to further the purposes of this disclosure.

FIG. 6 is a flowchart representing another process 600 for operating a group watching session, in accordance with some examples of the disclosure. It will be appreciated that the illustrative process shown in FIG. 6, may be implemented on system 100, either alone or in combination with any other appropriately configured system architecture, such as system 200.

At step 602, control circuitry determines that a user participating in the group watching session is likely to pause playback of the media content item at a future point in the media content item. For example, control circuitry may perform one or more steps similar to step 510 (and/or sub-steps 512 to 524) to determine that a user might be interested in, or have interest in discussing, one or more future segments of the media content item. For example, a preference of a user may be determined by analyzing historic viewing data of the user, one or more past communications of the user, and/or any other appropriate data that may indicate what the user is interested in. In this manner, system 100 may derive an understanding of which segment(s) of a media content item a user may be interested in discussing with one or more other participants in the group watching session, e.g., by virtue of a segment containing a favorite actor, being of a particular genre, etc. Such a user preference may be compared to the content of one or more future (e.g., upcoming and unwatched by the group) segments of the media content item, to determine a likelihood that at least one of the users in the group will want to pause the group watching session and discuss the media content item with one or more other users in the group watching session. For example, control circuitry may determine that User 2 has interest, e.g., a high level of interest, in segment D of the media content item, and, as such, there is high chance that User 2 will pause the group watching session to discuss the content of segment D with the other users in the group watching session, e.g., despite User 1 and User 3 showing less or no interest in the content of segment D.

At step 604, in response to determining that User 2 is likely to pause the media content item after segment D, control circuitry stops (or at least pauses) active playback buffer 404 for the media content item when the data stored in the active playback buffer 406 reaches the end of the segment D of the media content item (as indicated by arrow 414 extending from active buffer 404 to the end of segment D). In this manner, bandwidth of User 2 is not used to buffer further segments of the media content item in active buffer 404, e.g., at least until one or more other future conditions are met, as discussed below.

At step 606, control circuitry sets a communication parameter of the group communication to provide group video communication in response to determining that the active playback buffer has reached the end of the future segment in the media content item. For example, in response to active buffer 404 of User 2 successfully buffering the content of segment D, control circuitry may cause active buffer 404 (and optionally advanced playback buffer 412) to pause and enable/establish group video communication between the users in the group watching session. In this manner, any bandwidth that was being used for active buffer 404 may now be used for video communication between the users. For example, when progress through the media content item reaches the end of segment D, and User 2 wishes to discuss the content of segment D with User 1 and/or User 3, video communication may be automatically provided/established, e.g., in a desired quality, ahead of the time when User 2 wishes to discuss the content of segment D. In some examples, despite User 2 showing interest in segment D, User 1 and/or User 3 may not wish to discuss the content of segment D with User 2. To account for this, control circuitry may be configured to provide a user-selectable option to enable/disable communication between the users, e.g., where there is a disparity between the user's interests. In some examples, control circuitry may be configured to determine when discussion about a particular topic is coming to an end. For example, control circuitry may monitor video communication, e.g., video communication discussing segment D, to determine that the users have no further desire to continue with video communication. For example, control circuitry may determine that an audio component of the video communication contains one or more keywords, e.g., "bye-bye", that indicate that the users have finished their discussion. At the end of the video communication, control circuitry may terminate a video connection between the users and reactivate active buffer 404 and/or advanced playback buffer 412, since bandwidth is no longer required (at least for a moment) for video communication.

The actions or descriptions of FIG. 6 may be used with any other example of this disclosure, e.g., such as FIGS. 5A and 5B. In addition, the actions and descriptions described in relation to FIG. 6 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for operating a group watching session, the method comprising:
   determining at least one segment of a media content item that is of interest for discussion by at least one participant in the group watching session;

based at least in part on the determining, while buffering a first segment for present playing of the media content item in an active playback buffer, initiating additional buffering of a second segment in an additional buffer wherein the second segment is one of the at least one segment of the media content item determined to be of interest for discussion, and wherein the first segment and the second segment are separated by at least one intervening segment;

monitoring the playing of the media content item to detect when the playing reaches the second segment;

based at least in part on the monitoring:
  displaying the second segment of the media content item using the additional buffer; and
  initiating a group communication session for the group watching session.

2. The method of claim 1, further comprising:
pausing the active playback buffer for segments not identified as being of interest for discussion by the at least one participant in the group watching session.

3. The method of claim 1, further comprising:
accessing a user profile of the at least one participant of the group watching session to retrieve user preferences;
accessing metadata associated with the media content item; and
comparing the user preferences with the metadata to identify the at least one segment of the media content item determined to be of interest for discussion.

4. The method of claim 3, wherein the user profile comprises a conversation history of the group communication session among participants of the group watching session.

5. The method of claim 3, wherein the user profile comprises a viewing history.

6. The method of claim 1, wherein the group communication session is at least one of an audio communication and a video communication.

7. The method of claim 1, further comprising:
causing to be displayed the media content and the group communication session on a first device.

8. A system for operating a group watching session, the system comprising:
control circuitry configured to:
  determine at least one segment of a media content item that is of interest for discussion by at least one participant in the group watching session;
  based at least in part on the determining, while buffering a first segment for present playing of the media content item in an active playback buffer, initiate additional buffering of a second segment in an additional buffer wherein the second segment is one of the at least one segment of the media content item determined to be of interest for discussion, and wherein the first segment and the second segment are separated by at least one intervening segment;
  monitor the playing of the media content item to detect when the playing reaches the second segment;
  based at least in part on the monitoring:
    display the second segment of the media content item using the additional buffer; and
    initiate a group communication session for the group watching session.

9. The system of claim 8, wherein the control circuitry is further configured to:
pause the active playback buffer for segments not identified as being of interest for discussion by the at least one participant in the group watching session.

10. The system of claim 8, wherein the control circuitry is further configured to:
access a user profile of the at least one participant of the group watching session to retrieve user preferences;
access metadata associated with the media content item; and
compare the user preferences with the metadata to identify the at least one segment of the media content item determined to be of interest for discussion.

11. The system of claim 10, wherein the user profile comprises a conversation history of the group communication session among participants of the group watching session.

12. The system of claim 10, wherein the user profile comprises a viewing history.

13. The system of claim 8, wherein the group communication session is at least one of an audio communication and a video communication.

14. The system of claim 8, wherein the control circuitry is further configured to:
cause to be displayed the media content and the group communication session on a first device.

15. A non-transitory computer readable medium for operating a group watching session, the non-transitory computer readable medium comprising:
instructions that when executed by control circuitry cause the control circuitry to:
  determine at least one segment of a media content item that is of interest for discussion by at least one participant in the group watching session;
  based at least in part on the determining, while buffering a first segment for present playing of the media content item in an active playback buffer, initiate additional buffering of a second segment in an additional buffer wherein the second segment is one of the at least one segment of the media content item determined to be of interest for discussion, and wherein the first segment and the second segment are separated by at least one intervening segment;
  monitor the playing of the media content item to detect when the playing reaches the second segment;
  based at least in part on the monitoring:
    display the second segment of the media content item using the additional buffer; and
    initiate a group communication session for the group watching session.

16. The non-transitory computer readable medium of claim 15, further comprising instructions that when executed by the control circuitry cause the control circuitry to:
pause the active playback buffer for segments not identified as being of interest for discussion by the at least one participant in the group watching session.

17. The non-transitory computer readable medium of claim 15, further comprising instructions that when executed by the control circuitry cause the control circuitry to:
access a user profile of the at least one participant of the group watching session to retrieve user preferences;
access metadata associated with the media content item; and
compare the user preferences with the metadata to identify the at least one segment of the media content item determined to be of interest for discussion.

18. The non-transitory computer readable medium of claim 17, wherein the user profile comprises a conversation history of the group communication session among participants of the group watching session.

19. The non-transitory computer readable medium of claim 17, wherein the user profile comprises a viewing history.

20. The non-transitory computer readable medium of claim 15, wherein the group communication session is at least one of an audio communication and a video communication.

* * * * *